United States Patent
Fabiano

(10) Patent No.: US 9,231,830 B2
(45) Date of Patent: Jan. 5, 2016

(54) INTERCONNECTED LANDSCAPE GRAPHICAL INTERFACE GENERATOR

(75) Inventor: Serge Fabiano, Cannes la Bocca (FR)

(73) Assignee: SAP SE, Walldorf (DE)

( * ) Notice: Subject to any disclaimer, the term of this patent is extended or adjusted under 35 U.S.C. 154(b) by 161 days.

(21) Appl. No.: 13/481,220

(22) Filed: May 25, 2012

(65) Prior Publication Data

US 2013/0318452 A1  Nov. 28, 2013

(51) Int. Cl.
- *G06F 3/00* (2006.01)
- *G06F 15/177* (2006.01)
- *H04L 12/24* (2006.01)

(52) U.S. Cl.
CPC .............. *H04L 41/12* (2013.01); *H04L 41/145* (2013.01); *H04L 41/22* (2013.01)

(58) Field of Classification Search
CPC ....... H04L 41/22; H04L 41/12; H04L 41/145; G06F 17/3056; G06F 3/048
USPC ......................................... 715/734, 736, 762
See application file for complete search history.

(56) References Cited

U.S. PATENT DOCUMENTS

| | | | | |
|---|---|---|---|---|
| 6,392,661 | B1 * | 5/2002 | Tankersley | G06F 3/0485 340/945 |
| 6,477,572 | B1 * | 11/2002 | Elderton et al. | 709/224 |
| 6,971,063 | B1 * | 11/2005 | Rappaport et al. | 715/733 |
| 7,401,137 | B1 * | 7/2008 | Gasser et al. | 709/223 |
| 7,681,130 | B1 * | 3/2010 | Lavallee et al. | 715/735 |
| 7,962,860 | B2 * | 6/2011 | Eichner | 715/853 |
| 8,132,113 | B2 * | 3/2012 | Khan et al. | 715/762 |
| 8,185,832 | B2 * | 5/2012 | Kodosky et al. | 715/763 |
| 8,732,665 | B2 * | 5/2014 | Vedula et al. | 717/124 |
| 2002/0113816 | A1 * | 8/2002 | Mitchell | G06F 3/0481 715/734 |
| 2002/0135610 | A1 * | 9/2002 | Ootani et al. | 345/734 |
| 2003/0069960 | A1 | 4/2003 | Symons et al. | |
| 2004/0216054 | A1 * | 10/2004 | Mathews et al. | 715/765 |
| 2005/0210398 | A1 * | 9/2005 | Novak et al. | 715/765 |
| 2007/0097883 | A1 | 5/2007 | Liu et al. | |
| 2007/0142091 | A1 * | 6/2007 | Gasborro | G01C 21/20 455/566 |
| 2007/0150822 | A1 * | 6/2007 | Mansour et al. | 715/762 |
| 2007/0156861 | A1 * | 7/2007 | Nedelcu et al. | 709/220 |
| 2007/0174832 | A1 * | 7/2007 | Brehm et al. | 717/174 |
| 2007/0204231 | A1 | 8/2007 | Cunningham et al. | |

(Continued)

FOREIGN PATENT DOCUMENTS

EP   0457445 A2   11/1991

OTHER PUBLICATIONS

Wang, Haoxiang, "From a Mess to Graphic Maps: Visualization of Large-Scale Heterogeneous Networks", Jan. 22, 2010, Computer Modeling and Simulation, 2010 Second International Conference on, IEEE, ISBN: 978-0-7695-3941-6/10, pp. 531-535.*
Definitions: client, server; IEEE 100, The Authoritative Dictionary of IEEE Standards Terms, 7th edition, copyright 2000 by the Institute of Electrical and Electronics Engineers. ISBN 0-7381-2601-2. pp. 176, 1031-1033.*
European Application Serial No. 13001378.2, Extended European Search Report mailed Aug. 13, 2013, 10 pgs.

(Continued)

*Primary Examiner* — Steven Sax
*Assistant Examiner* — Wilson Varga
(74) *Attorney, Agent, or Firm* — Schwegman Lundberg & Woessner, P.A.

(57) ABSTRACT

A system and method include obtaining a landscape description document identifying resource elements and their connections in a computing infrastructure. The resource elements are converted into landscape user interface graphical representations of the elements. An interconnected landscape interface is generated using the graphical representations and connection information from the landscape description document.

12 Claims, 4 Drawing Sheets

(56) References Cited

U.S. PATENT DOCUMENTS

| | | | |
|---|---|---|---|
| 2008/0005292 A1* | 1/2008 | Vinberg et al. | 709/223 |
| 2009/0172507 A1* | 7/2009 | Choe | G06F 17/30303 714/819 |
| 2011/0022688 A1* | 1/2011 | Gvirtsman et al. | 709/220 |
| 2011/0047230 A1* | 2/2011 | McGee | H04L 41/0609 709/206 |
| 2011/0289119 A1* | 11/2011 | Hu et al. | 707/803 |
| 2012/0254805 A1* | 10/2012 | Pic | H04L 41/22 715/834 |
| 2013/0111374 A1* | 5/2013 | Hamilton | H04L 41/22 715/763 |
| 2013/0132850 A1* | 5/2013 | Subramanian et al. | 715/735 |

OTHER PUBLICATIONS

Wang, Haoxiang, "From a Mess to Graphic Maps: Visualization of Large-Scale Heterogeneous Networks", Second International Conference on Computer Modeling and Simulation, IEEE, (Jan. 22, 2010), 531-535.

Wang, Haoxiang, et al., "Network Topology Description and Visualization", 3rd International Conference on Advanced Computer Theory and Engineering (ICACTE), IEEE, (Aug. 20, 2010), 5 pgs.

Wang, Haoxiang, "NevML: A Markup Language for Network Topology Visualization", Second International Conference on Future Works, IEEE, (Jan. 22, 2010), 5 pgs.

\* cited by examiner

```xml
<?xml version="1.0" encoding="UTF-8"?>
<TechnicalSystem long_sid="SD7" type="JAVA" id="SD&~JAVA">
    <!-- Installed Products -->
    <ProductVersion name="SAP EHP2 FOR SAP NETWEAVER 7.0">
        <ProductInstance name="Application Server Java">
            <SoftwareComponentVersion name="ADOBE DOCUMENT SERVICES 7.02"/>
            <SoftwareComponentVersion name="SAP J2EE ENGINE 7.02"/>
            <SoftwareComponentVersion name="SAP J2EE ENGINE CORE 7.02"/>
        </ProductInstance>
    </ProductVersion>
    <Host name="ldai1sd7" ip="10.66.51.53" full_name="ldai1sd7.wdf.sap.corp">
        <!-- Installed OS -->
        <OperatingSystem name="LINUX_X86_64" bits="64" version="SLES10"/>
        <!-- Installed Instances -->
        <InstalledTechnicalSystem path="/user/sap/SD7/">
            <Instance type="DIALOG" name="D89" path="/user/sap/SD7/D89/" number="89">
                <Server type="SERVER" name="server0" node_id="898306050"/>
                <Dispatcher type="DISPATCHER" name="dispatcher" node_id="898306000"/>
            </Instance>
        </InstalledTechnicalSystem>
        <!-- Installed Database -->
        <Database name="SAP MaxDB 7.8 64-BIT: release="7.8.02"?>
    </Host>
</TechnicalSystem>
```

INTERCONNECTED LANDSCAPE GRAPHICAL INTERFACE GENERATOR

BACKGROUND

Computing infrastructures for an entity can be quite complex, consisting of many different resources such as systems, hosts, databases, network devices, and applications. It can be difficult to understand how all these resources interact with each other in order to manage and interact with the computing infrastructure.

SUMMARY

A method includes obtaining a landscape description document identifying resource elements and their connections in a computing infrastructure. The resource elements are converted into landscape user interface graphical representations of the elements. An interconnected landscape interface is generated using the graphical representations and connection information from the landscape description document.

In a further embodiment, a system includes an input device to receive a landscape description document identifying resource elements and their connections in a computing infrastructure. A library of landscape skins is correlated to types of resource elements, wherein the landscape skins are graphical representations of the types of elements. A renderer is used to generate an interconnected.

In one embodiment, a computer readable storage device has code to cause a machine to implement a method. The method includes obtaining a landscape description document identifying resource elements and their connections in a computing infrastructure. The resource elements are converted into landscape user interface graphical representations of the elements. An interconnected landscape interface is generated using the graphical representations and connection information from the landscape description document.

BRIEF DESCRIPTION OF THE DRAWINGS

FIG. 3 is a representation of a landscape description document describing a computing infrastructure according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software stored on storage devices, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
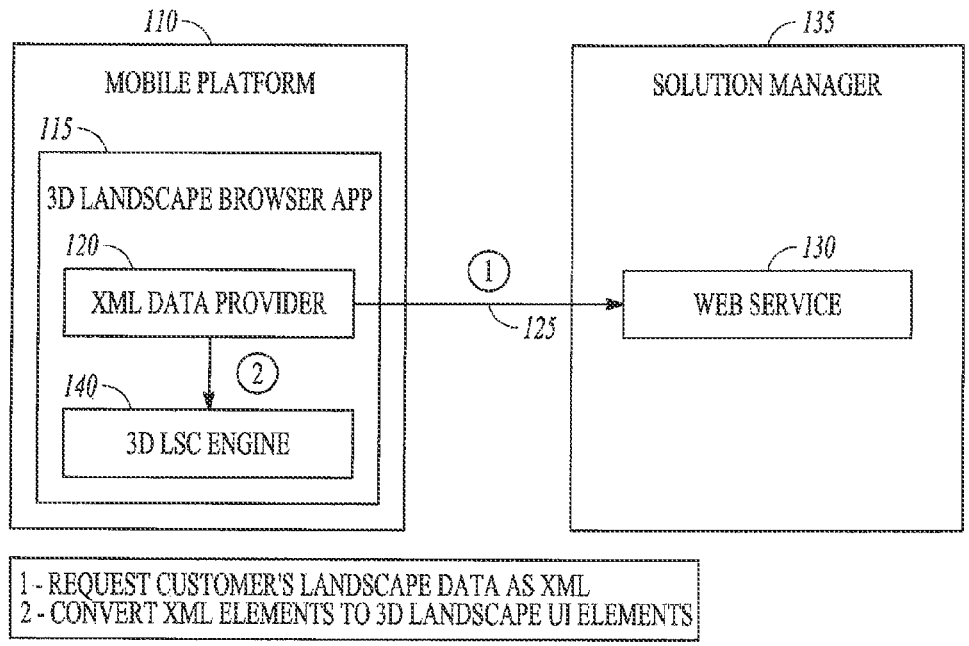
FIG. 1 is a block diagram of a device to provide a description of a computing infrastructure according to an example embodiment.

FIG. 1 is a block diagram of a device 110 to provide a description of a computing infrastructure according to an example embodiment. In one embodiment, the device 110 is a client device, such as a mobile device or desktop device. Such devices are aware of their own infrastructure and may also include infrastructure of a customer's many other devices in a network. The mobile device, referred to as a mobile platform, includes a landscape browser application 115, which may be referred to as a three dimensional landscape browser app in some embodiments. The browser application 115 includes document data provider 120, which provides a document describing the computing infrastructure of device 110 and other devices in a customer's computing infrastructure of which it is aware. In one embodiment, the document is written in a markup language, such as extended markup language (XML).

At 125, the provider 120 gets the document from a web service 130 running on a server 135, also referred to as a solution manager 135. Server 135 in one embodiment includes a solution manager, such as a Solution Manager from SAP identified as ABAB AS. The solution manager contains a representation of the customer's infrastructure. Interface elements are provided back to the mobile platform 110, where the elements, along with the document describing interconnections of the elements, are rendered by a landscape engine 140 for viewing and interacting with on a mobile platform display.

In various embodiments, the device 110 may include a mobile telephone of various makes and models, mobile pads, and many other devices. Given a common description document language and corresponding interface elements, each device 110, regardless of make, is capable of displaying the landscape with an identical interface. Mobile devices are being equipped with capabilities usually thought of as powerful desktop computer capabilities. This trend is expected to continue with such devices being equipped with more powerful graphic chips and other capabilities. Thus, mobile devices are exhibiting the same complexity of computing infrastructure as desktop computers.

Figure 2:
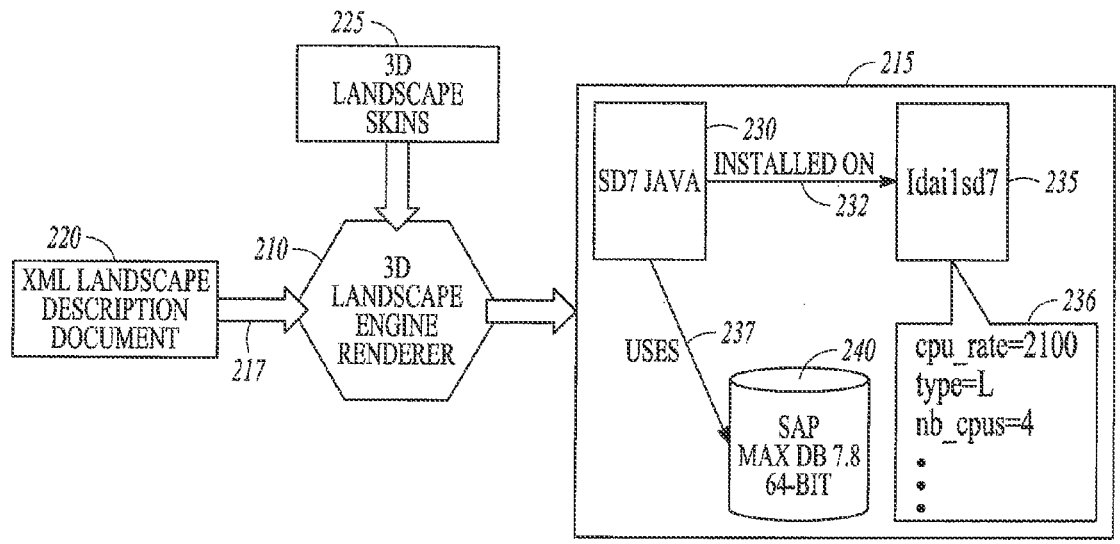
FIG. 2 is a block diagram of a landscape engine renderer and a simplified representation of an example resulting user interface of the computing infrastructure landscape according to an example embodiment.

FIG. 2 is a block diagram of a landscape engine renderer 210 and a simplified representation of an example resulting user interface 215 of the computing infrastructure landscape according to an example embodiment. The renderer 210 includes an input device 217 that receives a landscape description document 220, and also accesses a library of landscape skins 225. The skins 225 in one embodiment are graphical representations of elements. Each type of element in the document is mapped to a skin, which is a representation of the element. Three such elements are shown in user interface 215. A technical system 230 is labeled SD7 Java. The user interface shows a connector 232 labeled "installed on", and pointing to a host skin 235 labeled ldai1sd7. The technical system 230 also has a connector 237 pointing to a database skin 240. The connector 237 specifies that the technical system 230 uses the database 240, which is labeled Max DB. The labels on skins and connectors are read from the landscape description document 220. The description document 220 also specifies how all the elements are connected, allowing the landscape engine renderer 210 to generate the user interface 215. In one embodiment, the skins are representations that appear like a three dimensional representation of the elements.

FIG. 3 is a representation of a landscape description document 300 describing a computing infrastructure according to an example embodiment. In one embodiment, the document is written in XML. Beginning at 310, a technical system is described corresponding to technical system 230. The name is provided to label the system 230. At 312 the beginning of installed products is described. At 315, a product version name is provided, followed by a product instance name and various component and version names. The product version ends at 320.

The host is then identified at 325, and the name is also specified. At 330, the operating system on the host is identified and installed instances are described starting at 332 with a path to the host identified at 334. At 335, the database 240 is identified with a name. As seen in the document 300, additional information is provided for each of the elements. In some embodiments, the additional information may be provided via the interface by hovering a cursor over an element, or clicking on the element.

The landscape description document 300 is a simplified, and may contain much more information about each component. For instance, a complete Host tag may look like the following:

```
<Host class_name="CL_DIAGLS_HOST"
    global_id="0050568a-163e-02de-aacf-bfcd4c3a026d"
    caption="ldai1sd7"
    registration_source="LMDB"
    id="ldai1sd7"
    creation_date="20100316125632"
    sld_id="ldai1sd7"
    sld_key="SAP_ComputerSystem.CreationClassName="SAP_ComputerSystem",Name="ldai1sd7""
    name="ldai1sd7"
    full_name="ldai1sd7.wdf.sap.corp" ip="10.66.51.53"
    physical_ram_mb="40220"
    virtual_ram_mb="82940"
    nb_cpus="4"
    manufacturer="VMware, Inc."
    cpu_rate="2100"
    cpu_type="Six-Core AMD Opteron(tm) Processor 8425 HE"
    type="L"
    agent_status="STARTED"
    virtual_sol_name="VIRT_METHOD_VMWARE_ESX"
    virtual_sol_vers="VMware"
    ips="127.0.0.1, 127.0.0.2, 10.66.51.11, 10.66.51.53, 10.72.49.185"
full_names="localhost, 127.0.0.2, vml2262.wdf.sap.corp,
ldai1sd7.wdf.sap.corp, vml2262b.wdf.sap.corp"/>
```

Several additional attributes of the host are identified, including a global_id, caption, registration_source, sld_key, and physical attributes such as physical and virtual memory sizes, manufacturer, cpu rates and types, and more data. One or more of these additional attributes may be used to provide labels for the skins, and in further embodiments, hovering a cursor over the skins may initiate a pop-up window with additional information from the document related to the component represented by the skin. One such window is shown at 236 in FIG. 2, illustrating further information being provided for host skin 235.

Figure 4:
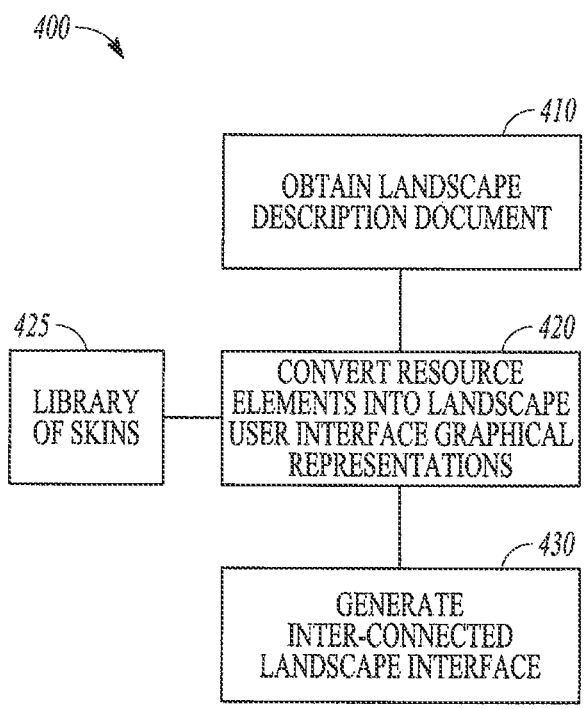
FIG. 4 is a flow diagram illustrating a method of providing a graphical interface representative of a computing infrastructure according to an example embodiment.

FIG. 4 is a flow diagram illustrating a method 400 for generating a user interface representative of a computing infrastructure. At 410, a landscape description document is obtained that identifies resource elements and their connections in a computing infrastructure. At 420, the resource elements are converted into landscape user interface graphical representations of the elements. At 430, an interconnected landscape interface is generated using the graphical representations and connection information from the landscape description document.

in one embodiment, converting the resource elements into graphical landscape user interface graphical representations includes retrieving landscape skins from a library of skins correlated to types of resource elements as indicated at 425. The landscape description document is an extended markup language (XML) document in one embodiment, and may be provided to the server by a network connected server client, and wherein the landscape description document is representative of a computing infrastructure of the client.

In one embodiment, the graphical representations in the landscape are linked to further graphical representations to provide an interactive graphical interface to the computing infrastructure. The graphical representations may include two dimensional representations giving the appearance of three dimensional objects, such as hosts, databases, systems, network devices, and other element that may be included in a computing infrastructure.

Figure 5:
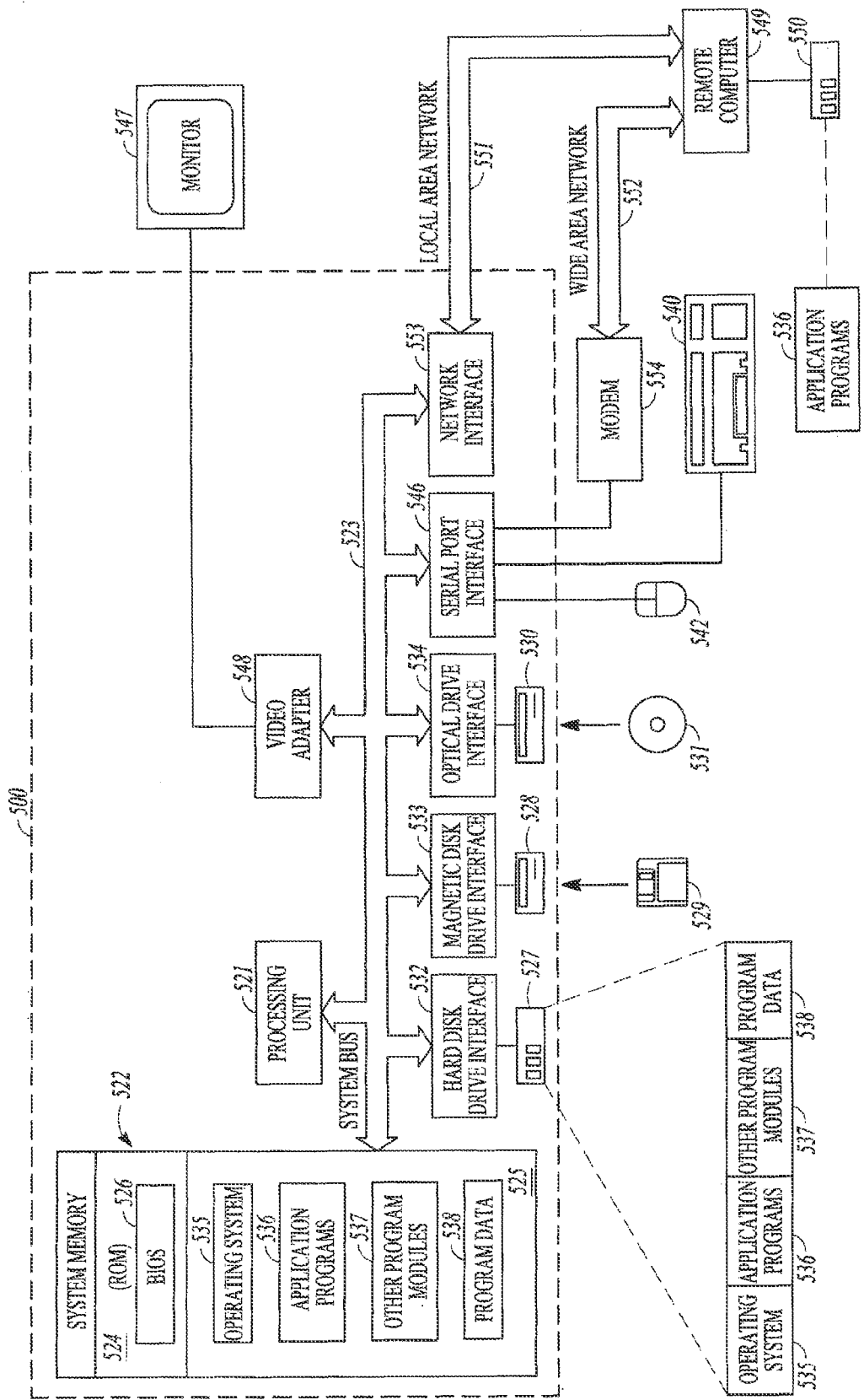
FIG. 5 is an example computer system capable of implementing one or more example embodiments.

FIG. 5 is a block diagram of a computer system to implement methods according to an example embodiment. In the embodiment shown in FIG. 5, a hardware and operating environment is provided that is applicable to any of the servers and/or remote clients shown in the other Figures.

As shown in FIG. 5, one embodiment of the hardware and operating environment includes a general purpose computing device in the form of a computer 500 (e.g., a personal computer, workstation, or server), including one or more processing units 521, a system memory 522, and a system bus 523 that operatively couples various system components including the system memory 522 to the processing unit 521. There may be only one or there may be more than one processing unit 521, such that the processor of computer 500 comprises a single central-processing unit (CPU), or a plurality of processing units, commonly referred to as a multiprocessor or parallel-processor environment. In various embodiments, computer 500 is a conventional computer, a distributed computer, or any other type of computer.

The system bus 523 can be any of several types of bus structures including a memory bus or memory controller, a peripheral bus, and a local bus using any of a variety of bus architectures. The system memory can also be referred to as simply the memory, and, in some embodiments, includes read-only memory (ROM) 524 and random-access memory (RAM) 525. A basic input/output system (BIOS) program 526, containing the basic routines that help to transfer information between elements within the computer 500, such as during start-up, may be stored in ROM 524. The computer 500 further includes a hard disk drive 527 for reading from and writing to a hard disk, not shown, a magnetic disk drive 528 for reading from or writing to a removable magnetic disk 529, and an optical disk drive 530 for reading from or writing to a removable optical disk 531 such as a CD ROM or other optical media.

The hard disk drive 527, magnetic disk drive 528, and optical disk drive 530 couple with a hard disk drive interface 532, a magnetic disk drive interface 533, and an optical disk drive interface 534, respectively. The drives and their associated computer-readable media provide non volatile storage of computer readable instructions, data structures, program modules and other data for the computer 500. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 529, optical disk 531, ROM 524, or RAM 525, including an operating system 535, one or more application programs 536, other program modules 537, and program data 538. Programming for implementing one or more processes or method described herein may be resident on any one or number of these computer-readable media.

A user may enter commands and information into computer 500 through input devices such as a keyboard 540 and pointing device 542. Other input devices (not shown) can include a microphone, joystick, game pad, satellite dish, scanner, or the like. These other input devices are often connected to the processing unit 521 through a serial port interface 546 that is coupled to the system bus 523, but can be connected by other interfaces, such as a parallel port, game port, or a universal serial bus (USB). A monitor 547 or other type of display device can also be connected to the system bus 523 via an interface, such as a video adapter 548. The monitor 547 can display a graphical user interface for the user. In addition to the monitor 547, computers typically include other peripheral output devices (not shown), such as speakers and printers.

The computer 500 may operate in a networked environment using logical connections to one or more remote computers or servers, such as remote computer 549. These logical connections are achieved by a communication device coupled to or a part of the computer 500; the invention is not limited to a particular type of communications device. The remote computer 549 can be another computer, a server, a router, a network PC, a client, a peer device or other common network node, and typically includes many or all of the elements described above I/O relative to the computer 500, although only a memory storage device 550 has been illustrated. The logical connections depicted in FIG. 5 include a local area network (LAN) 551 and/or a wide area network (WAN) 552. Such networking environments are commonplace in office networks, enterprise-wide computer networks, intranets and the internet, which are all types of networks.

When used in a LAN-networking environment, the computer 500 is connected to the LAN 551 through a network interface or adapter 553, which is one type of communications device. In some embodiments, when used in a WAN-networking environment, the computer 500 typically includes a modem 554 (another type of communications device) or any other type of communications device, e.g., a wireless transceiver, for establishing communications over the wide area network 552, such as the internet. The modem 554, which may be internal or external, is connected to the system bus 523 via the serial port interface 546. In a networked environment, program modules depicted relative to the computer 500 can be stored in the remote memory storage device 550 of a server, such as remote computer 549. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

EXAMPLES

1. A method comprising:
obtaining a landscape description document identifying resource elements and their connections in a computing infrastructure;
converting the resource elements into landscape user interface graphical representations of the elements; and
generating an interconnected landscape interface using the graphical representations and connection information from the landscape description document.

2. The method of example 1 wherein converting the resource elements into graphical landscape user interface graphical representations includes retrieving landscape skins from a library of skins correlated to types of resource elements.

3. The method of example 1 or 2 wherein the landscape description document is an extended markup language (XML) document.

4. The method of any of examples 1-3 where the method is performed at a server, wherein the landscape description document is provided to the server by a network connected server client, and wherein the landscape description document is representative of a computing infrastructure of the client.

5. The method of any of examples 1-4 wherein the graphical representations in the landscape are linked to further graphical representations to provide an interactive graphical interface to the computing infrastructure.

6. The method of any of examples 1-5 wherein the graphical representations include two dimensional representations giving the appearance of three dimensional objects.

7. The method of example 6 wherein the graphical representations include a host and a database.

8. The method of any of examples 6-7 wherein the graphical representations include a system and a network device.

9. A system comprising:
an input device to receive a landscape description document identifying resource elements and their connections in a computing infrastructure;
a library of landscape skins correlated to types of resource elements, wherein the landscape skins are graphical representations of the types of elements; and
a renderer to generate an interconnected landscape interface using the graphical representations and connection information from the landscape description document.

10. The system of example 9 and further comprising a network connector to couple to a network to receive landscape descriptions and to provide the interconnected landscape interface to a client.

11. The system of example 10 wherein the renderer further provides labels on the graphical representations corresponding to identifiers of the resource elements.

12. The system of any of examples 9-11 wherein the landscape description document is an extended markup language (XML) document.

13. The system of any of examples 9-12 wherein the system is a server, and wherein the landscape description document is provided to the server by a network connected server client, and wherein the landscape description document is representative of a computing infrastructure of the client.

14. The system of any of examples 9-13 wherein the graphical representations in the landscape are linked to further graphical representations to provide an interactive graphical interface to the computing infrastructure; and wherein the graphical representations include two dimensional representations giving the appearance of three dimensional objects.

15. The system of example 14 Wherein the graphical representations include a host, a database, a system, and a network device.

16. A computer readable storage device having instructions stored thereon to cause a machine to implement a method, the method comprising:
obtaining a landscape description document identifying resource elements and their connections in a computing infrastructure;
converting the resource elements into landscape user interface graphical representations of the elements; and
generating an interconnected landscape interface using the graphical representations and connection information from the landscape description document, 17. The computer readable storage device of example 16 wherein converting the resource elements into graphical landscape user interface graphical representations includes retrieving landscape skins from a library of skins correlated to types of resource elements.

18. The computer readable storage device of any of examples 16-17 wherein the landscape description document is an extended markup language (XML) document.

19. The computer readable storage device of any of examples 16-18 where the method is performed at a server, wherein the landscape description document is provided to the server by a network connected server client, and wherein the landscape description document is representative of a computing infrastructure of the client.

20. The computer readable storage device of any of examples 16-19 wherein the graphical representations in the landscape are linked to further graphical representations to provide an interactive graphical interface to the computing infrastructure and wherein the graphical representations include two dimensional representations giving the appearance of three dimensional objects, 21. The computer readable storage device of example 20 wherein the graphical representations include a host, a database, a system, and a network device.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
obtaining a landscape description document on a mobile device, the landscape description document identifying resource elements and their connections in a computing infrastructure, wherein the landscape description document is provided to a server by a server client device and is provided by the server to the mobile device, and wherein the landscape description document is representative of a computing infrastructure of the server client device;
converting the resource elements on the mobile device into landscape user interface graphical representations of the elements; and
generating an interconnected landscape interface on the mobile device using the graphical representations and connection information from the landscape description document, wherein the interconnected landscape interface includes landscape user interface graphical representations of a first resource element including a label describing the first resource element, a graphical representation of a first connector pointing to a graphical representation of a second resource element including a label describing the second resource element, on which the first resource element runs, the first connector graphical representation labeled to describe an installed on relationship between the first resource element and the second resource element, wherein the labels are derived from the landscape description document, wherein converting the resource elements into graphical landscape user interface graphical representations includes retrieving geometric shaped landscape skins from a library of skins correlated to types of resource elements identified in the landscape description document, the method further comprising generating a graphical representation of a second connector between the first resource element and a graphical representation of a third resource element including a label describing the third resource element, the graphical representation of the second connector labeled to describe that the first resource element uses the third resource element, and wherein the graphical representations in the landscape are linked to further graphical representations to provide an interactive graphical interface to the computing infrastructure such that selection of a graphical representation pops up a display of additional information about the corresponding resource element derived from the landscape description document.

2. The method of claim 1 wherein the landscape description document is an extended markup language (XML) document obtained from a remote server, and representative of the computing infrastructure comprising a mobile device originally obtained from the mobile device.

3. The method of claim 1 wherein the graphical representations include two dimensional representations giving the appearance of three dimensional objects.

4. The method of claim 3 wherein the graphical representations include a host and a database.

5. The method of claim 4 wherein the graphical representations include a system and a network device.

6. A system comprising:
an input device to receive a landscape description document identifying resource elements and their connections in a computing infrastructure, wherein the resource elements include hardware elements and software elements of the computing infrastructure, wherein the landscape description document is provided to a server by a server client device and is provided by the server to the input device, and wherein the landscape description document is representative of a computing infrastructure of the server client device;
a library of geometric shaped landscape skins correlated to types of resource elements identified in the landscape description document, wherein the landscape skins are graphical representations of the types of resource elements; and
a renderer to generate an interconnected landscape interface using the graphical representations and connection information from the landscape description document, wherein the computing infrastructure comprises a computer system having multiple resource elements, each resource element represented by a landscape skin that includes a label derived from the landscape description document, including a landscape skin for a host and a landscape skin for a database resource element, and connectors including labels specifying a relationship between resource elements, including an installed on relationship wherein the relationship labels are derived from the landscape description document, and wherein the graphical representations in the landscape are linked to further graphical representations to provide an interactive graphical interface to the computing infrastructure such that selection of a graphical representation pops up a display of additional information about the corresponding resource element derived from the landscape description document.

7. The system of claim 6 wherein the renderer further provides labels on the landscape skins derived from the landscape description document, wherein the landscape skins are three dimensional geometric representations of the resource elements.

8. The system of claim 6 wherein the landscape description document is an extended markup language (XML) document.

9. The system of claim 6 wherein the graphical representations include a system, and a network device.

10. A non-transitory computer readable storage device having instructions stored thereon to cause a machine to implement a method, the method comprising:

obtaining a landscape description document on a mobile device, the landscape description document identifying resource elements and their connections in a computing infrastructure, wherein the resource elements include hardware elements and software elements of the computing infrastructure, and wherein the landscape description document is provided to a server by a server client device and is provided by the server to the mobile device, and wherein the landscape description document is representative of a computing infrastructure of the server client device;

converting the resource elements on the mobile device into landscape user interface graphical representations of the elements; and generating an interconnected landscape interface on a display of the mobile device using the graphical representations and connection information from the landscape description document, wherein the interconnected landscape interface includes a landscape user interface graphical representation of a first resource element including a label describing the first resource element, a graphical representation of a first connector pointing to a graphical representation of a second resource element including a label describing the second resource element, on which the first resource element runs, the first connector graphical representation labeled to describe an installed on relationship between the first resource element and the second resource element wherein the installed on relationship labels are derived from the landscape description document, and wherein converting the resource elements into graphical landscape user interface graphical representations includes retrieving geometric shaped landscape skins from a library of skins correlated to types of resource elements identified in the landscape description document, the method further comprising generating a graphical representation of a second connector between the first resource element and a graphical representation of a third resource element including a label describing the third resource element, the graphical representation of the second connector labeled to describe that the first resource element uses the third resource element, and wherein the graphical representations in the landscape are linked to further graphical representations to provide an interactive graphical interface to the computing infrastructure such that selection of a graphical representation pops up a display of additional information about the corresponding resource element derived from the landscape description document.

11. The non-transitory computer readable storage device of claim 10 wherein the landscape description document is an extended markup language (XML) document.

12. The non-transitory computer readable storage device of claim 10 wherein the graphical representations include a host, a database, a system, and a network device.

* * * * *